L. SOMMER.
FLYING MACHINE.
APPLICATION FILED JULY 14, 1911.
1,065,739.
Patented June 24, 1913.
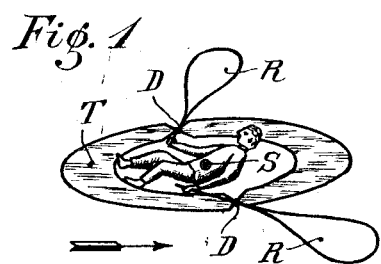
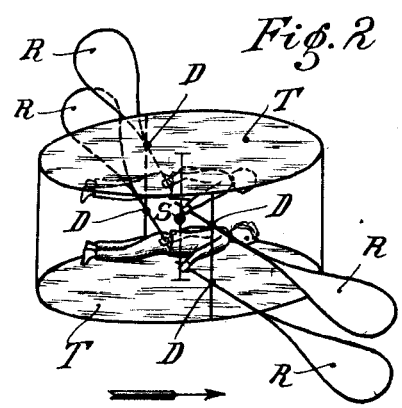
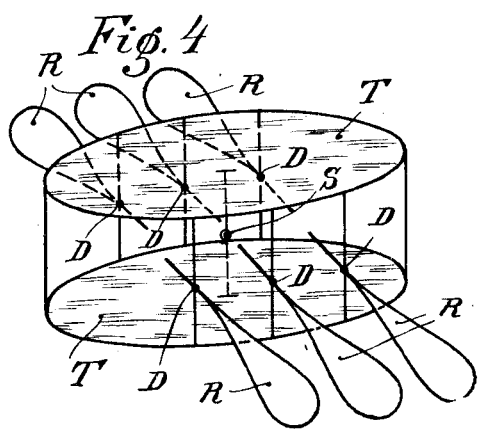
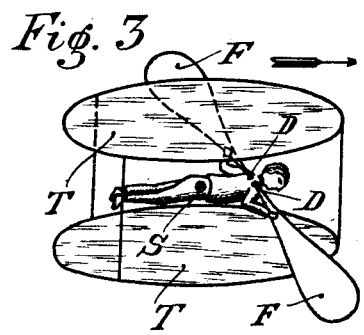
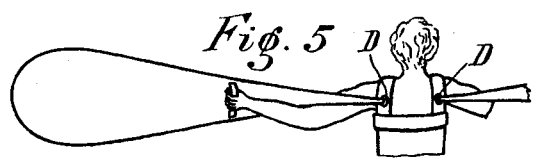
Witnesses
Eugene Wening
Clarissa Franck
Inventor
Ludwig Sommer
by his Attorney

UNITED STATES PATENT OFFICE.

LUDWIG SOMMER, OF MUNICH, GERMANY.

FLYING-MACHINE.

1,065,739.

Specification of Letters Patent.

Patented June 24, 1913.

Application filed July 14, 1911. Serial No. 638,498.

*To all whom it may concern:*

Be it known that I, LUDWIG SOMMER, citizen of Germany, residing at Munich, Bavaria, Germany, have invented certain new and useful Improvements in Flying-Machines; and I do hereby declare the following to be a full, clear, and exact description of the invention, such as will enable others skilled in the art to which it appertains to make and use the same.

The present invention relates to a flying-apparatus which enables man to fly without the aid of a motor or a balloon filled with gas.

The device is based on the principle of animal flight. The organs of flight, for instance, in the case of birds, consist of wings, of which the outermost parts, act as oars, while the inner surfaces, and also the tail feathers, are to be considered as carrying or sustaining surfaces. For purposes of human flight it is advisable to provide separate parts to act as oar and carrying surfaces, as to combine these surfaces into one, as with birds, presents great technical difficulties.

The invention is illustratively exemplified in the accompanying drawings, wherein—

Figure 1 is a perspective view of a form of the invention embodying a single sustaining plane; Fig. 2 is a similar view of a modified form embodying two parallel sustaining planes; Fig. 3 is a similar view of a further modified form wherein the actuating members are supported from the body of the operator; Fig. 4 is a similar view of a still further modified form; Fig. 5 is a rear elevational view of a human being showing the manner of attaching the actuating members.

A flying-device according to the present invention consists of one or more parallel plane or slightly curved surfaces, of any desired form, for instance, circular or ring-shaped. For imparting motion to the device and for steering, oars or wings arranged in pairs are provided.

Each oar or wing is connected to the flying device at one point only, the turning-point. A wing may have its connection, that is, its turning-point, on the body of the person flying, for instance, as shown in Fig. 5 in a plan view, the wing is connected to a band on the back of the person. Each oar or wing is pivoted at the point of turning in such a manner, that it can be moved either up or down, backward or forward in any desired curves or circles and can also be turned about its longitudinal axis. The guidance and turning of the shafts of the oars is accomplished with the help of a handle projecting inward from the point of turning; in the case of a wing, for instance, a handle arranged beyond the point of turning may serve for this purpose. The outer part of each oar or wing consists of a surface, which may be of very different forms.

If the flying-device is operated by human power alone, it is necessary in the case of normal horizontal flight, for the center of gravity of the person flying to correspond with the center of gravity of the carrying surface or surfaces.

It will be obvious that a flying-device of the kind here described may be provided with several pairs of oars or wings and may be manned by several persons. In the latter case the above-mentioned condition as to the center of gravity must also be taken into consideration.

Referring to Figs. 1 to 4 D designates the turning-points of the oars or wings, S is the center of gravity of the carrying surfaces, corresponding approximately with the center of gravity of the person. To avoid confusion, the means of connecting the seat or other means of rest to the frame is not shown in the drawing.

What I claim as my invention and desire to secure by Letters Patent, is:

1. In a device of the character described, the combination with a sustaining plane, of means whereby a human being may be supported by said plane with the center of gravity of said human being coinciding with the center of gravity of said plane, and oar like actuating means supported at one point only and capable of being manually moved in any direction relatively to said plane.

2. In a device of the character described, the combination with a plurality of parallel planes, of means for supporting a human being so that the center of gravity of said human being coincides with the center of gravity of the plurality of planes, and oar like actuating means supported at one point only and capable of being manually moved in any direction relatively to said planes.

3. In a device of the character described, the combination with a sustaining plane, of a plurality of means each thereof being adapted to support a human being with his center of gravity coinciding with the center of gravity of said plane, and oar like actuating means supported by the device at one point only and capable of being manually moved in any direction relatively to said plane.

In testimony whereof I hereunto affix my signature in the presence of two witnesses.

LUDWIG SOMMER.

Witnesses:
ARTHUR V. W. COXE,
MATHILDE R. HELD.